United States Patent [19]

Thomson et al.

[11] 4,424,952
[45] Jan. 10, 1984

[54] METERING UNIT

[75] Inventors: David Thomson; Benjamin Korec, both of Cambridge, Canada

[73] Assignee: Waltec Inc., Cambridge, Canada

[21] Appl. No.: 423,760

[22] Filed: Sep. 27, 1982

[30] Foreign Application Priority Data

Mar. 31, 1982 [CA] Canada .................................. 400800

[51] Int. Cl.³ ........................ F16K 31/48; F16K 47/10
[52] U.S. Cl. ......................................... 251/54; 138/43; 138/45; 138/46; 188/299; 188/317; 188/320; 251/121
[58] Field of Search ............................. 138/43, 45, 46; 188/299, 317, 319, 320; 251/51, 52, 54, 55, 121

[56] References Cited

U.S. PATENT DOCUMENTS

| | | |
|---|---|---|
| 793,698 | 7/1905 | Walter .................................. 251/54 |
| 1,670,002 | 5/1928 | Pferdmenges ........................ 251/54 |
| 2,325,264 | 7/1943 | Merten ................................. 251/54 |
| 2,363,754 | 11/1944 | Smith et al. ........................... 138/46 |
| 2,552,479 | 5/1951 | Copping ............................... 251/54 |
| 2,720,890 | 10/1955 | Stroud ................................ 251/121 |
| 2,918,248 | 12/1959 | Schoenrock, Jr. ................... 251/54 |
| 2,991,795 | 7/1961 | Fraser et al. ......................... 251/52 |
| 3,147,827 | 9/1964 | Weisheit ............................... 251/54 |
| 3,168,111 | 2/1965 | Strauss ................................. 251/54 |
| 3,177,895 | 4/1965 | Danel .................................. 251/54 |
| 3,361,162 | 1/1968 | Prestridge et al. .................... 138/43 |
| 3,525,497 | 8/1970 | Zalar .................................. 251/121 |
| 3,933,337 | 1/1976 | Morris et al. ......................... 251/54 |
| 4,093,177 | 6/1978 | Morris et al. ......................... 251/54 |
| 4,165,857 | 8/1979 | Morris et al. ......................... 251/54 |

FOREIGN PATENT DOCUMENTS 675777 12/1963 Canada .

765703 8/1967 Canada .

*Primary Examiner*—George L. Walton
*Attorney, Agent, or Firm*—Neuman, Williams, Anderson & Olson

[57] ABSTRACT

Disclosed is a liquid metering valve unit, particularly for water. The unit uses a dash-pot mechanism filled with metering liquid such as water, silicone oil or a mixture of water and glycerine. The dash-pot mechanism is a closed system. The unit comprises a sleeve member having an axial bore and a transverse bore communicating with the axial bore. One end of the axial bore connects to a liquid supply and the transverse bore connects to an outlet. A valve stem in the axial bore is slidable between an open position and a closed position in which a resilient seat washer seals the end of the axial bore. A spring biasses the stem toward the closed position and the stem can be manually moved to the open position. Movement of the stem to the closed position is controlled by a dash-pot mechanism or regulating means comprising a cup washer secured to the stem and disposed within a liquid-filled chamber betwen the stem and sleeve. The chamber is divided into two portions by the cup washer, which portions are interconnected by passageways within the stem. One of the passageways contains a compressible wad of porous material and movement of the valve towards the open position causes the cup washer to collapse to allow water to move from the first portion of the chamber to the second portion. Movement of the valve toward the closed position causes the cup washer to seal the second portion of the chamber from the first and force metering liquid to flow through the compressible wad, which regulates closing time of the valve.

8 Claims, 1 Drawing Figure

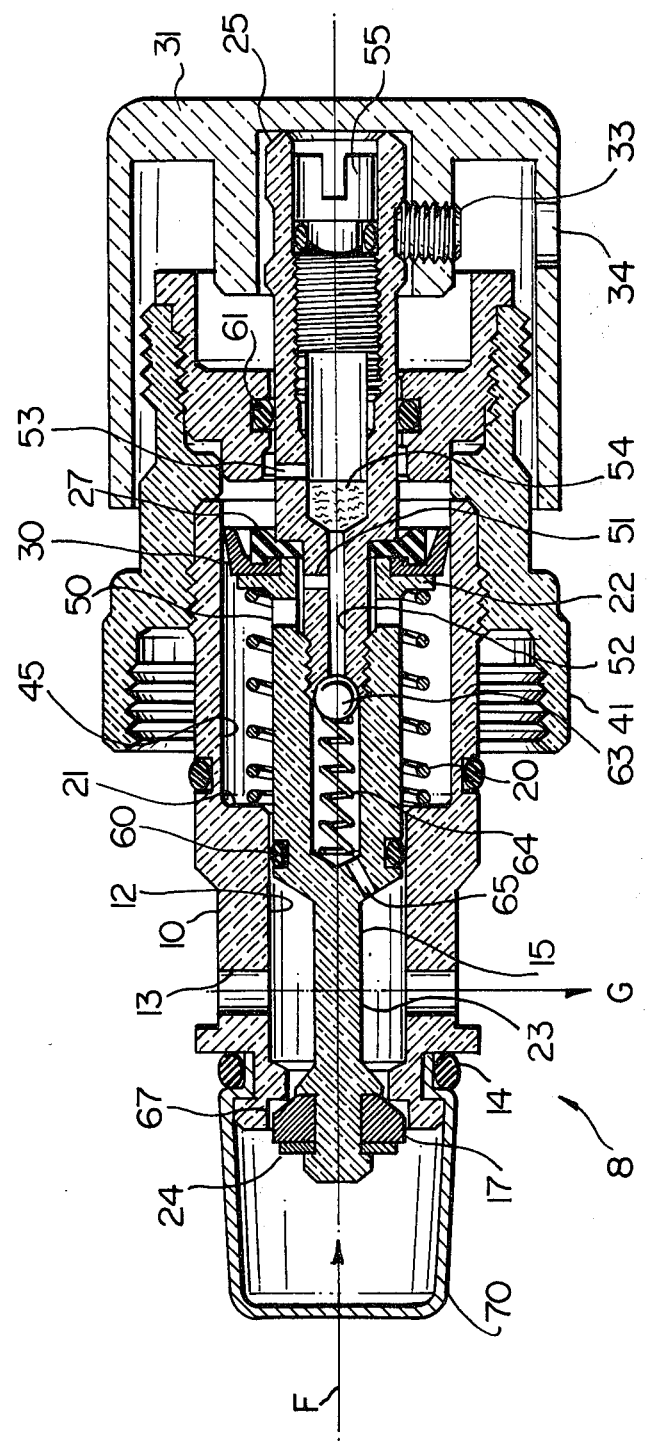

METERING UNIT

BACKGROUND OF THE INVENTION

This invention relates to metering valves, and in particular metering valves for liquids such as water.

Various metering valve units are known in the prior art, but have various disadvantages such as unreliable cycle times over certain limits, such as ten seconds, and a necessity to shut off the water line and remove the metering unit from the body to expose the metering screw in order to reset the cycle time. Also, in some units, metering is achieved by passing water through a compressed wad of felt. Since each cycle uses fresh water, any impurities in that water clogs the felt and lengthens the time required to pass the same amount of water. Eventually the felt is so clogged that no water passes through and the unit then runs continuously, instead of shutting off.

U.S. Pat. No. 2,918,248 of Schoenrock, Jr., issued Dec. 22, 1959, discloses a dash-pot for a flush valve which does have a closed system using water but it does not have a felt wad to vary the closing rate.

U.S. Pat. No. 4,165,857 of Morris et al, issued Aug. 28, 1979, refers to the prior art problem of gradual loss of hydraulic liquid. It solves this problem by using rolling diaphragms to contain a dash-pot liquid, in this case silicone. Adjustment of the flow rate is by means of a needle valve.

U.S. Pat. No. 3,147,827 of Weisheight, issued Sept. 8, 1964, relates to a damper for a valve which uses oil and is aimed at avoiding the problem of air getting into the damper, which would introduce a spring effect. The unit is adjustable by means of a needle valve throttle and the valve is electromagnetically actuated.

Canadian Pat. No. 675,777 of Filliung, issued Dec. 10, 1963, relates to a flush valve which is useful with salt water and other impure water supplies in that the valve mechanism is completely isolated from the water supply. A valve member 25 comprises rubber or neoprene and separates the valve mechanism from the water supply. A dash-pot mechanism 40 is used to allow the valve to open quickly but close slowly. The dash-pot is filled with hydraulic oil and the rate of closing of the valve is controlled by a needle valve member 56 rather than a wad of compressible material such as felt.

Canadian Pat. No. 765,703 of Parkison, issued Aug. 22, 1967, discloses a rotary valve. A button is pushed to actuate the valve and it does not turn. It moves a spiral cam 35 against a spring tending to bias the valve to the closed position. The valve includes a dash-pot which uses water from the supply and the water is replenished each time the valve is actuated. Adjustment of the throttling means is by means of a needle valve 44, rather than by a compressible wad of porous material.

U.S. Pat. No. 3,933,337 of Morris et al, issued Jan. 20, 1976, discloses an adjustable dash-pot mechanism which uses liquid silicone as the timing liquid. Timing adjustments are made by adjusting the position of a rod-like body within a hollow stem to vary the areas of passageways in the stem. The structure is quite complicated and includes separate metering and valve cartridges, a reservoir piston as well as metering piston, and separate springs for the water valve and reservoir piston. The structure according to the invention is simpler and comprises a single cartridge. A compressible wad of porous material is used to regulate timing.

SUMMARY OF THE INVENTION

The present invention provides a liquid metering valve unit which can be adjusted through the front of the unit without shutting off the water supply or removing the unit. The cycling time is adjustable for from about 2 seconds up to about 10 minutes. The metering media, e.g. felt or open cell foam plastic, does not plug up since it is in a closed system and the cycle time is repeatable and reliable.

Thus, according to a broad aspect of the invention, there is provided a liquid metering valve unit comprising a sleeve member having an axially extending bore and at least one transverse bore communicating with said axially extending bore, said axially extending bore having one end adapted to be connected to a liquid supply conduit and said transverse bore being adapted to be connected to an outlet conduit, a valve stem being retained in said axially extending bore for slidable movement between an open position and a closed position in which a resilient seat washer seals said one end of the axially extending bore, spring means biasing said stem toward the closed position, means for manually moving the stem to the open position and regulating means for regulating movement of said stem from the open position to the closed position, said regulating means comprising an annular cup washer secured to said stem and disposed within an annular liquid-filled chamber formed between said stem and sleeve, said chamber being divided into first and second portions by said cup washer and said first and second chamber portions being interconnected by passageways within said stem, one of said passageways containing a compressible wad of porous material, whereby movement of said valve toward the open position causes said cup washer to collapse to allow liquid to move from the first portion of the chamber to the second portion whereas movement of the valve toward the closed position causes said cup washer to seal said second portion of the chamber from the first portion of the chamber and force liquid to flow from the second portion of the chamber through said passageways and said compressible wad, flow through said compressible wad regulating closing time of the valve.

BRIEF DESCRIPTION OF THE DRAWING

The invention will now be further described in conjunction with the accompanying drawing which illustrates, in cross-sectional form, a preferred arrangement of a metering valve unit according to the invention.

DESCRIPTION OF THE PREFERRED EMBODIMENT

Referring to the drawing, the preferred embodiment according to the invention comprises a cartridge generally indicated at 8 including a sleeve member 10 having an axially extending bore 12 and at least one transverse bore 13 communicating with the axially extending bore 12. The axially extending bore 12 has one end (the left in the drawing) adapted to be connected to a water supply conduit (not shown). The O ring 14 provides a seal between the sleeve 10 and the supply conduit. Water enters the unit as indicated by the arrow F. The cartridge 8 is secured to a housing, not shown, by an internally threaded cap nut 41.

The transverse bore 13 is adapted to be connected to an outlet conduit, not shown, from which water exits as indicated by arrow G.

A valve stem 15 is retained in the axially extending bore 12 for slidable movement between an open position and the closed position shown in the drawing, in which a resilient seat washer 17 seals the one end of the axially extending bore 12.

A spring 20 bears against a shoulder 21 in the sleeve 10 and against an annular shoulder 22 on the valve stem 15, the spring 20 biasing the valve stem 15 toward the closed position.

The valve stem 15 includes two main pieces 23 and 25 which are screwed together. A retaining ring 24 holds the seat washer 17 on the end of part 23 of the valve stem and part 25 bears against a plastic washer 27 which, in turn, holds an annular resilient (e.g. rubber) cap washer 30 against the shoulder 22 on the stem 15.

The stem may be manually moved to the open position by pushing on push button 31. This moves seat washer 17 away from the end of bore 12 so that water may exit via bore 13. Push button 31 is locked to the stem portion 25 by means of a set screw 33. A hole 34 in the push button 31 allows access to the set screw 33 and reduces the danger of damage by vandals.

It will be noted that the cup washer 30 is disposed within a chamber 45 formed between the stem 15 and the sleeve 10, the chamber being divided into first and second portions by the cup washer 30. It will further be noted that the first and second chamber portions are interconnected by passageways 50, 51, 52 and 53 within the stem 15, the passageway 52 containing, in an enlarged portion, a compressible wad 54 of porous material such as felt or open cell foam plastic. Movement of the valve toward the open position causes the cup washer 30 to collapse to allow metering liquid (e.g. silicone or water) to move from the first (left) portion of the chamber to the second (right) portion, whereas movement of the valve toward the closed position, under the influence of the spring 20 and water supply pressure, causes the cup washer 30 to seal the second portion of the chamber from the first portion of the chamber and force the metering liquid to flow from the second portion of the chamber through the passageways 50-53 and the compressable wad 54. Flow of liquid through the compressable wad 54 regulates the closing time of the valve and this closing time is adjustable by means of the screw 55 in the right end of stem portion 25 without shutting off the water supply. By tightening the screw 55, after removing the push button 31, the wad 54 is further compressed, thus increasing the closing time of the valve.

Because the compressable wad 54 is disposed in a closed system, it cannot be contaminated with dirt from the water supply. It will be appreciated that the chamber 45 is filled with metering liquid during assembly of the valve at the factory.

A few words may be in order regarding the metering liquid. If silicone oil is used, a small amount tends to escape to the water outlet despite the O-ring 60 so that, eventually, it will have to be replenished. The same problem does not seem to occur if water is used as the metering liquid, either because water, being of lower viscosity, does not "stick" to the stem as much as oil, or because the water is simply replenished from the water supply being controlled. However, with water, problems can occur during shipping or storage in cold weather in that the water in the metering chambers can freeze and damage the unit. To avoid this problem, one can use a mixture of water and glycerine. The glycerine acts as anti-freeze and is non-toxic. During operation, the glycerine tends to escape eventually, leaving the metering chambers filled with straight water but, in normal operation, a building containing the valve unit is heated in winter so that freezing is not a problem. Therefore, a water-glycerine mixture is presently preferred as a metering liquid. The glycerine concentration may be selected to secure protection against freezing to a predetermined low temperature. Other non-toxic substances suitable for protection against freezing may occur to those skilled in the art.

Incidentally, the amount of water replacement in the metering chambers will be very small so that contamination by dirt from the water supply will be practically negligible. Futhermore, the preferred embodiment uses a filter screen 70 so that only very small dirt particles could possibly enter the valve in any case.

When the chamber 45 is first filled with metering liquid, it operates normally if the unit is being used to control the flow of cold water. However, if the unit is used to control the flow of hot water, e.g. 110°-120° F., the complete mechanism is heated, as is the liquid in the closed system (chamber 45). Expansion of the liquid in the closed system, for which there is no room, can cause deformation and compression of the O-rings 60 and 61, which can jam the mechanism. To prevent this from happening, the unit includes a pressure relief valve system, comprising a check ball 63 and a spring 64. Expansion and increased pressure caused by hot water unseats the check ball 63 and excess liquid is allowed to leave through hole 65, thereby relieving any pressure build up. This only happens once, the first time the unit is subjected to hot water. Since the excess liquid is removed during the initial use in hot water, there will not be any pressure build up on subsequent hot water usage.

To eliminate whistling and vibration just before the seat washer 17 shuts off, the outside diameter of the seat washer enters a closely dimensioned hole 67 in the end of the sleeve 10 which slows down the water velocity. The hardness of the rubber seat washer 17 is also important as regards prevention of whistling. If the washer is softer than 90 Durometer Shore A, whistling and vibration can occur. If it is much harder then 90 durometer, it becomes difficult to seal without leaking.

In the full valve open position, the force of the spring 20, tending to close the valve, is, of course, assisted by the water pressure acting against the end of the stem portion 23 and retaining ring 24.

The cycle time of the unit is approximately from 2 seconds to 10 minutes. A five-fifteen second cycle can be used for hand washing, urinal flushing, drinking bubblers, water conservation toilets, etc. A one-three minute cycle can be used for showers.

The unit preferably includes an in-line filter screen 70 around the seat washer 17. Now no primary water filtering is required and the design is essentially trouble free.

Although the embodiment illustrated is actuated by pushing a push-button 31 it will be obvious that any other suitable actuating means could be used, e.g. an oscillating handle. Also, although the unit has been described in connection with controlling water flow, other liquids could also be controlled.

We claim:

1. A metering valve unit comprising a sleeve member having an axially extending bore and at least one transverse bore communicating with said axially extending bore, said axially extending bore having one end adapted to be connected to a water supply conduit and said transverse bore being adapted to be connected to an outlet conduit, a valve stem being retained in said axially extending bore for slidable movement between an open position and a closed position in which a resilient seat washer seals said one end of the axially extending bore, spring means biasing said stem toward the closed position, means for manually moving the stem to the open position and regulating means for regulating movement of said stem from the open position to the closed position, said regulating means comprising an annular cup washer secured to said stem and disposed within an annular liquid-filled chamber formed between said stem and sleeve, said chamber being divided into first and second portions by said cup washer and said first and second chamber portions being interconnected by passageways within said stem, one of said passageways containing a compressible wad of porous material, whereby movement of said valve toward the open position causes said cup washer to collapse to allow liquid to move from the first portion of the chamber to the second portion whereas movement of the valve toward the closed position causes said cup washer to seal said second portion of the chamber from the first portion of the chamber and force liquid to flow from the second portion of the chamber through said passageways and said compressible wad, flow through said compressible wad regulating closing time of the valve, including adjustable means for compressing said compressible wad to thereby adjust the rate of closing of said valve and wherein said passageways communicate with a check valve which, when open, connects said passageways to said outlet whereby, if the valve expands when subjected to hot water, some liquid may escape from said chamber via said passageways and check valve to prevent seizing of the valve.

2. A valve unit as claimed in claim 1 including a screen filter secured to the first end of said sleeve to prevent dirt entering the valve from the water supply.

3. A valve unit as claimed in claim 1 wherein said adjustable means comprises a screw threadably received in a bore in an end of said stem, said bore communicating with the passageway containing said compressible wad.

4. A valve unit as claimed in claim 3 including a capnut secured to said sleeve and a push button secured to said valve stem.

5. A valve unit as claimed in claim 1, wherein said compressible wad is felt.

6. A valve unit as claimed in claim 1, wherein said compressible wad is open cell foam plastic.

7. A valve unit as claimed in claim 1, wherein said liquid is water.

8. A valve unit as claimed in claim 1, wherein said liquid is a mixture of glycerine and water.

* * * * *